United States Patent
Safai et al.

(10) Patent No.: US 7,460,109 B2
(45) Date of Patent: Dec. 2, 2008

(54) NAVIGATION AND FINGERPRINT SENSOR

(75) Inventors: Max Safai, Los Altos, CA (US); John Julian Uebbing, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 543 days.

(21) Appl. No.: 10/689,317

(22) Filed: Oct. 20, 2003

(65) Prior Publication Data

US 2005/0083310 A1    Apr. 21, 2005

(51) Int. Cl.
  *G06F 3/041* (2006.01)
  *G06K 9/34* (2006.01)
(52) U.S. Cl. ........................ 345/173; 382/184
(58) Field of Classification Search ......... 345/156–184; 382/124–126, 181, 182, 184
  See application file for complete search history.

(56) References Cited

U.S. PATENT DOCUMENTS

| | | | | |
|---|---|---|---|---|
| 5,841,078 | A * | 11/1998 | Miller et al. | 178/18.06 |
| 6,597,347 | B1 * | 7/2003 | Yasutake | 345/173 |
| 6,995,748 | B2 * | 2/2006 | Gordon et al. | 345/166 |
| 2003/0044021 | A1 * | 3/2003 | Wilkinson et al. | 381/56 |
| 2005/0104867 | A1 * | 5/2005 | Westerman et al. | 345/173 |

FOREIGN PATENT DOCUMENTS

| | | |
|---|---|---|
| EP | 0929028 | 1/1999 |
| EP | 1396812 | 9/2003 |
| GB | 2357335 A | 12/1999 |
| WO | WO 2001/59558 | 2/2001 |
| WO | WO2004/104813 | 2/2004 |

\* cited by examiner

*Primary Examiner*—Sumati Lefkowitz
*Assistant Examiner*—Srilakshmi K Kumar

(57) ABSTRACT

A pressure sensitive cursor control suitable for applications that include cellular phones and personal data assistants includes a pressure sensor array suitable to detect a human fingerprint. Cursor control is provided by subtle finger movement. Sequential images of the finger are captured and compared to determine planar movement or data entry. Performance may be improved by sampling zones within the captured image and comparing the zones with those in an earlier image. Performance could also be improved by sub-sampling the array. While the full resolution of the pressure-sensing array is needed to capture ones fingerprint and execute an authentication function only a subsampled image from the array is needed to derive meaningful navigation data. The pressure sensor array is designed on a glass substrate in order to drive down the unit cost. The silicon companion chip where the data is interpreted also drives the array and can therefore sub-sample the array when navigating and/or get a full resolution image when authenticating.

20 Claims, 3 Drawing Sheets

NAVIGATION AND FINGERPRINT SENSOR

BACKGROUND

The functions and settings of a cellular phone are controlled via menu selection. Typically, the device's display unit presents menus and the first required function/setting can be selected by browsing the menus and then possibly set a required value on it. The menus are often arranged in a hierarchy having a base of which there are some main branches (main menus) from which the submenus branch, and possibly more submenus can further branch from these.

From this kind of menu, one can select by browsing with arrow keys to indicate the right function by a cursor or the menu branch indicating it, and by accepting the choice with an acceptance key. The arrow key is typically a thumb-size rocker button positioned over an analog input device, e.g. mini-joystick or button, situated in the center of the cellular phone. This device is based on sensing the forces applied by the user's finger in the x and y directions. While this device is quite satisfactory in terms of pointing function, its use requires dexterity on the part of the user.

Traditional capacitive touch pads, used in large screen applications, cannot be used in small portable electronic products as their size versus resolution ratio limits the accuracy and usefulness of the navigational data output. Their usefulness is further limited by their inability to provide biometric data.

Optical navigation, similar to the traditional capacitive touch pads, is used in large screen applications. For a typical optical mouse navigation sensor, the sensed array of pixels ranges from 16×16 to 32×32 pixels. This is the amount of information needed to accurately correlate one picture to the other. The correlation occurs over a number of different displacement choices. The distance traveled corresponds to the offset needed to obtain the best correlation.

Individual pressure switch sensors typically have a significant capacitance. The data lines take a finite time to settle after the sense line has had its voltage raised. The readout for each row is limited, e.g. 25 kHz and rate per bit limited, 1 Mbit/sec. Accurate optical navigation requires frame rates of about 500 Hz. This means that each frame can only have about 2000 pixels in it. Further, though optical navigation is ideal for a desktop system, it may not be optimal for the mobile electronic market as any input device to a battery operated portable product needs to be small, thin and very low power.

With the optical mouse or optical navigation, there is another technical challenge with respect to the various surfaces that the mouse could be operating upon. As the user could use the mouse on any number of surfaces, correlating and deducing X&Y movement, from the data is very complicated. Very fast frame rates are required along with a sophisticated navigation algorithm to achieve accurate positioning.

Conventional navigation techniques do not adapt well to small screen applications.

SUMMARY

A system for providing cursor manipulation when using a human finger includes a sensing surface operative to sense pressure applied by the human finger. A pressure sensor array is disposed on the sensing surface, wherein a measurement of the plurality of pressure sensors corresponds to an image. An image detector receives images from the pressure sensor array and generate cursor manipulation corresponding to changes between the images. The cursor manipulation corresponds to planar directional movement or data input.

In operation, the pressure sensitive cursor control is suitable for applications that include cellular phones and personal data assistants. Cursor control is provided by subtle finger movement. Serial images of the finger are captured and compared to determine planar movement or data entry. Performance may be improved by sampling zones within the captured image and comparing the zones with those in an earlier image. This is repeated in the next paragraph.

Performance could also be improved by subsampling the array. While the full resolution of the pressure-sensing array is needed to capture ones fingerprint and execute an authentication function only a subsampled image from the array is needed to derive meaningful navigation data. The pressure sensor array is designed on a glass substrate in order to drive down the unit cost. The silicon companion chip where the data is interpreted also drives the array and can therefore sub-sample the array when navigating and/or get a full resolution image when authenticating.

DETAILED DESCRIPTION

A pressure-based fingerprint sensor detects the extra pressure under the fingerprint ridges when the finger is pressed onto the sensor. The fingerprint sensors are arranged as pressure sensing arrays; e.g. 256×256 50 micron micro-switches or micro-pressure sensors. Pressure sensing could be achieved a number of different ways, capacitive or mechanical. With this invention, a pressure sensor or pressure sensing array can be used both as a biometric device used to authenticate a user's fingerprint as well as derive cursor movement for a menu driven system. A "mini touch pad" could be created that can successfully achieve both functions.

Finger-based navigation may be used to move a cursor on a personal computer (PC), portable digital assistant (PDA), or cell phone screen by moving the finger around the fingerprint sensor. With the micro switch array and pressure sensing system, deducing navigational data could be simpler as the surface touching the array is the human finger, a known surface, and as its size is limited very fast movements are not going to be possible therefore the requirement of very fast frame rate does not apply.

Figure 1:
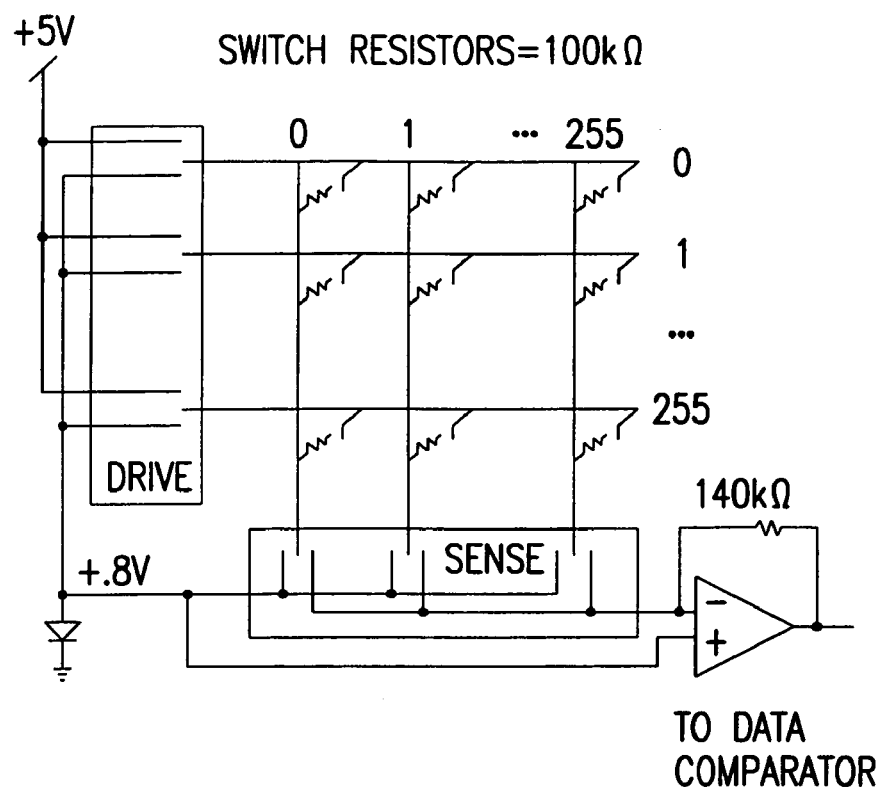
FIG. 1 illustrates a circuit diagram corresponding to a prior art pressure-based fingerprint sensor.
Figure 2:
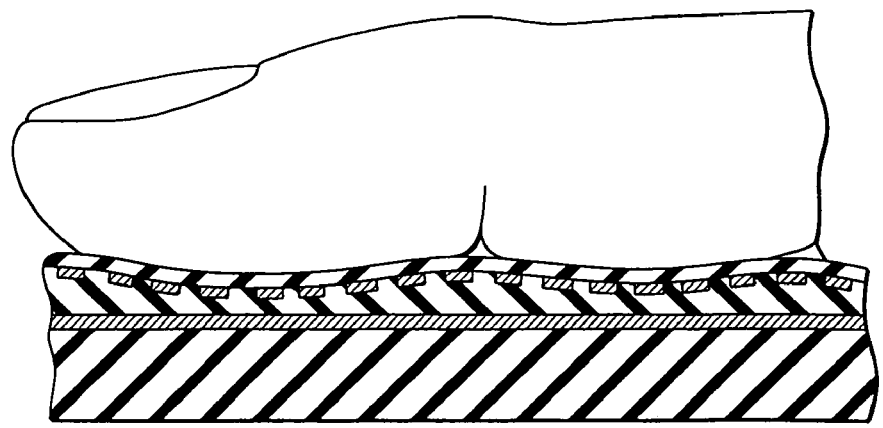
FIG. 2 illustrates a human finger on a fingerprint pressure sensor.

FIG. 1 illustrates a circuit diagram corresponding to a prior art pressure-based fingerprint sensor. The presence of the region of high pressure or fingerprint ridge is read out of the sensor by a series of electrical connections at right angles to one another. When a human finger is pressed onto a fingerprint pressure sensor, it will only touch in a few spots, as shown in FIG. 2. The navigation window needs to move around on the sensor to where the imprint is most satisfactory.

In an alternate embodiment, using an array of micro-electronic machine switches (MEMs), similar to that disclosed by Ganaphthi, et al. in "Method and Apparatus for Sensing", U.S. Patent Application 20020166388, filed on 14 May 2002, one can track the motion of the finger. As the finger moves, some of the switches are released, speed and direction are derived from their state, e.g. depressed or uncompressed.

Navigation requires less data than identification. The first step is capturing a snapshot of features at different moments in time. These snapshots are then compared to determine whether a given feature, e.g. whorl or outline of a finger, has moved. This comparison provides directional movement.

In a pressure sensor array, the data content per snapshot may be reduced by sub-sampling. The sub-sampling can occur by reducing the sampled resolution of the overall array or by reducing the number of regions that data is gathered. This reduced data allows for increased performance in navigation content. FIGS. 3A-D describe different sub-sampling methods. For each embodiment, the sampled pixels are circled.

Figure 3B:
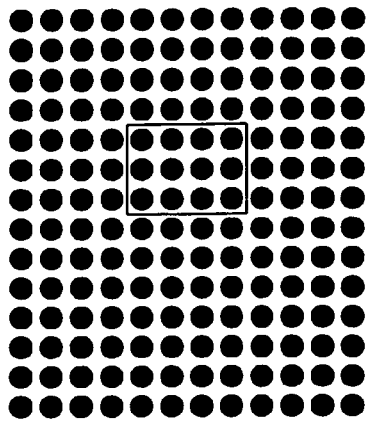
FIGS. 3A-D show alternate embodiments of sampling the pressure sensor array to determine navigational movement according to the present invention.
Figure 3D:
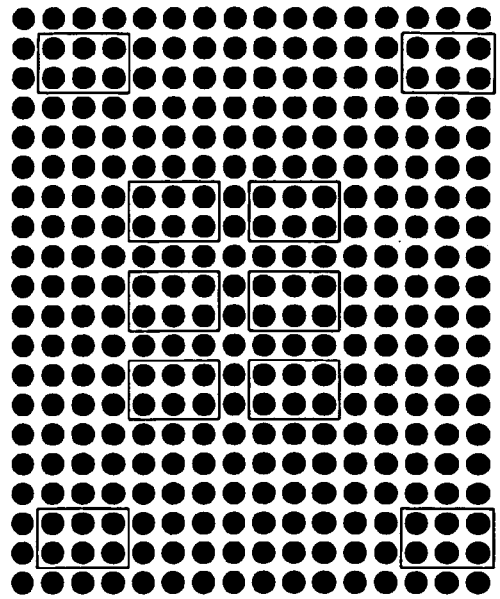
Figure 3A:
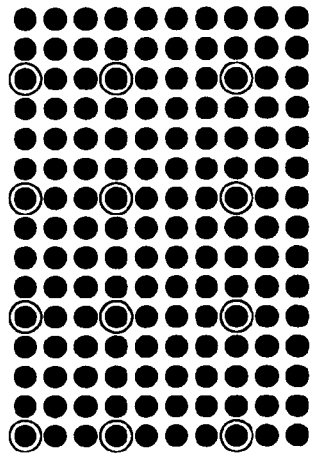

In one embodiment, the sampling resolution of the array may be reduced by periodically sampling alternating pixels in an array. The actual sampling resolution is related to the size of the feature. To illustrate, the outline of a finger requires less sampling than tracking a whorl. The user may select the sub-sampling rate based on the size of the tracked feature. FIG. 3A illustrates an array where every fourth pixel is sampled. As the resolution of the sensor so nearly matches that required for the human fingerprint, overall sub sampling may lead to the loss of important correlation data.

In another embodiment, the number of regions that data is gathered is reduced, e.g. zonal navigation, but the sampling resolution remains relatively high. The sampling resolution for fingerprint identification may be used. In the simplest form, a single region or zone is monitored. In a single zone embodiment, shown in FIG. 3B, snapshots of that zone are compared to determine whether a small feature, e.g. whorl, has moved. This embodiment provides limited navigation content. When the finger travels outside of the zone, tracking ceases and navigation stops.

Figure 3C:
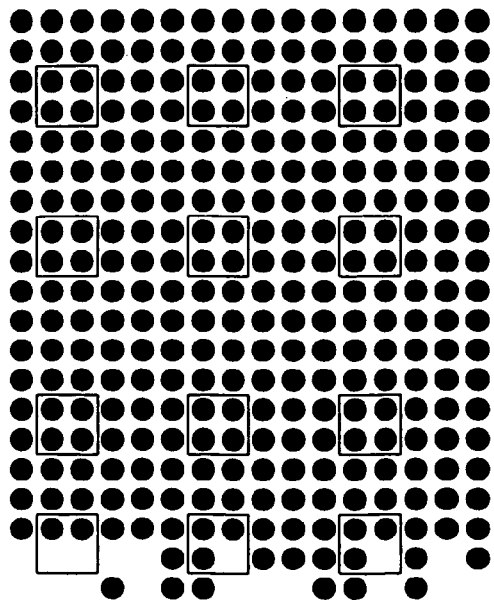

For redundancy and reliability, the snapshot may include more than one zone of active navigation. Thus, if one zone loses contact with the finger, the other zones still provide navigation information. Multi-zone navigation is illustrated in FIGS. 3C and 3D. In these embodiments, several navigation zones are selected through the array and navigation data is determined from all of them. Thus, if the finger travels outside a specific region, the other regions will keep tracking. In FIG. 3C, the zones are evenly distributed throughout the array. In FIG. 3D, the zones are distributed in a pattern appropriate to the end application of the system. A video game may require a different pattern than a simple menu selection. Thus, the zones may populate the overall array with varying density.

Figure 4:
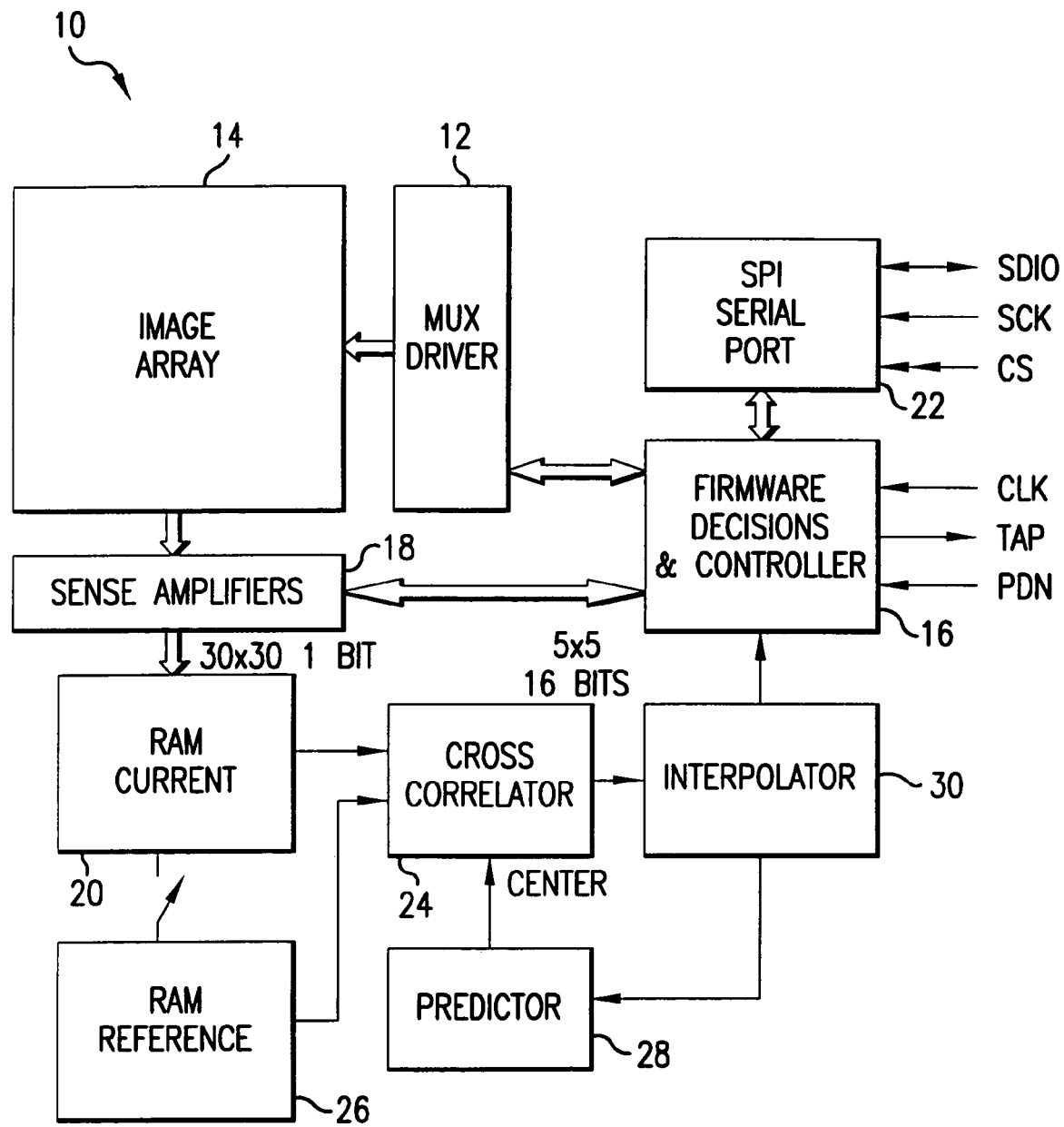
FIG. 4 illustrates a functional block diagram of the present invention.

FIG. 4 illustrates a functional block diagram 10 of the present invention. A multiplex (MUX) driver 12 sends data to an image array 14 and transceives data from a firmware decisions and controller 16. The output of the image array 14 is received by row and column sense amplifiers 18. The data is sent to current random access memory (RAM) 20 and bidirectionally communicates with a firmware decisions and controller 16. A serial port 22 bidirectionally communicates with the firmware decisions and controller 16. A cross-correlator 24 receives and processes data from the current RAM 20, reference RAM 26, and predictor 28. The result is received by the interpolator 30 that in turn sends it to the predictor 28 and the firmware decisions and controller 16.

The image array may be an array of pressure sensors. The array may be designed on a glass substrate. A silicon companion chip or integrated circuit includes the remaining blocks. The integrated circuit interprets the data according to the sampling described in FIGS. 3A-D. Thus the array may be sub-sampled when navigating or a full resolution image may be sampled when authenticating.

In operation, the user may press hard upon the sensor. This will be interpreted as a "click" or "enter" operation. As an example 1000 g force could be interpreted as a hard press where as to get a fingerprint impression 200 g to 500 g force should suffice.

A pressure sensitive cursor control suitable for applications that include cellular phones and personal data assistants includes a pressure sensor array suitable to detect a human fingerprint. Subtle finger movement provides cursor control. Serial images of the fingerprint are captured and compared to determine planar movement or data entry. Alternatively, the image of the fingerprint may be compared to stored images. When a match occurs, e.g. positive identification, restricted access to the device may begin. The tactile image of the fingerprint undergoes a template generating algorithm where the various points of bifurcation or trifurcation of the fingerprint help create. Some fingerprint algorithms will also add different information to this template, information such as the nature of the curves of the fingerprint, etc. The template that is generated is then compared to the "decrypted" template that was stored previously in the phone memory and a figure of merit is given for a potential match.

While the above illustrations depict embodiments that are appropriate to a cellular phone, it will be apparent to those with skill in the art that the input device of the present invention may be used in laptop computers, automatic teller machines, portable gaming devices, or other applications requiring user input.

The invention claimed is:

1. A device comprising:
   a mobile embedded device having a cursor manipulator, the cursor manipulator including,
      a sensing surface operative to sense contact by the human finger, the contact corresponding to applied pressure,
      a pressure sensor array disposed on the sensing surface, wherein a measurement of the plurality of pressure sensors corresponds to an image, and
      an image detector, receiving images from the pressure sensor array, generating cursor manipulation corresponding to changes between the images, wherein a sampling resolution of the sensing surface is based on at least one of periodically sampling alternating pixels in the pressure sensor array such that sampled pixels are distributed in a periodic pattern throughout the pressure sensor array and monitoring at least one of a plurality of zones in the pressure sensor array, wherein the plurality of zones are distributed in a non-overlapping pattern throughout the pressure sensor array, and wherein each of the plurality of zones includes multiple pixels of the pressure sensor array, the plurality of zones collectively providing navigation data.

2. The device, as defined in claim 1, wherein the cursor manipulation corresponds to planar directional movement.

3. The device, as defined in claim 1, wherein the cursor manipulation corresponds to data entry.

4. The device, as defined in claim 1, the image detector including:
   a controller;
   a multiplex driver, transceiving data to and from the controller;
   an image array, receiving data from the multiplex driver;
   sense amplifiers, connected to the image array, transceiving data to and from the controller;

a serial port transceiving data with the controller;
current read access memory (RAM) connected to the sense amplifiers;
reference RAM, connected to the current RAM;
a predictor;
a cross-correlator receiving and processing data from the current RAM, reference RAM and the predictor; and
an interpolator, receiving data from the cross-correlator, transmitting data to the predictor and the controller.

5. The device, as defined in claim 1, wherein the mobile embedded device is selected from a group comprising personal data assistants and cellular phones.

6. A device, as defined in claim 1, wherein the sampling resolution of the sensing surface is based on the monitoring the multiple zones of the plurality of zones in the pressure sensor array.

7. A device, as defined in claim 1, wherein the sampling resolution of the sensing surface is based on the periodically sampling the alternating pixels in the pressure sensor array such that the sampled pixels are distributed in the periodic pattern throughout the pressure sensor array.

8. A system for providing cursor manipulation when using a human finger comprising:
a sensing surface operative to sense contact by the human finger, the contact corresponding to applied pressure, the sensing surface having a sampling resolution based on at least one of periodically sampling alternating pixels in an array such that sampled pixels are distributed in a periodic pattern throughout the array and monitoring at least one of a plurality of zones in the pressure sensor array, wherein the plurality of zones are distributed in a non-overlapping pattern throughout the pressure sensor array, and wherein each of the plurality of zones includes multiple pixels of the pressure sensor array, the plurality of zones collectively providing navigation data;
a pressure sensor array disposed on the sensing surface, wherein a measurement of the plurality of pressure sensors corresponds to an image; and
an image detector, receiving images from the pressure sensor array, generating cursor manipulation corresponding to changes between the images.

9. The system, as defined in claim 8, wherein the cursor manipulation corresponds to planar directional movement.

10. The system, as defined in claim 8, wherein the cursor manipulation corresponds to data input.

11. The system, as defined in claim 8, the image detector including:
a controller;
a multiplex driver, transceiving data to and from the controller;
an image array, receiving data from the multiplex driver;
sense amplifiers, connected to the image array, transceiving data to and from the controller;
a serial port transceiving data with the controller;
current read access memory (RAM) connected to the sense amplifiers;
reference RAM, connected to the current RAM;
a predictor;
a cross-correlator receiving data from the current RAM, reference RAM, and the predictor; and
an interpolator, receiving data from the cross-correlator, transmitting data to the predictor and the controller.

12. A system, as defined in claim 8, wherein the sampling resolution is based on the monitoring the multiple zones of the plurality of zones in the pressure sensor array.

13. A system, as defined in claim 8, wherein the sampling resolution is based on the periodically sampling the alternating pixels in the pressure sensor array such that the sampled pixels are distributed in the periodic pattern throughout the pressure sensor array.

14. A method for finger navigation of a cursor comprising:
sampling a portion of an array of pressure sensors to generate a first sample based on at least one of periodically sampling alternating pixels in the array such that sampled pixels are distributed in a periodic pattern throughout the array and monitoring at least one of a plurality of zones in the array, wherein the plurality of zones are distributed in a non-overlapping pattern throughout the array, and wherein each of the plurality of zones includes multiple pixels of the array, the plurality of zones collectively providing navigation data;
re-sampling the portion of the array to generate a second sample; and
comparing the first and second samples to determine planar movement of the finger to generate directional input reflected in navigational movement of the cursor.

15. A method, as defined in claim 14, wherein the portion is a subset of the array.

16. A method, as defined in claim 15, wherein the subset is a region of pressure sensors.

17. A method, as defined in claim 16, wherein the region has an area comparable to a fingerprint.

18. A method, as defined in claim 16, wherein the subset further comprises a second region of pressure sensors.

19. A method, as defined in claim 14, wherein the sampling includes sampling the portion of the array of pressure sensors to generate the first sample based on the monitoring the multiple zones of the plurality of zones in the array.

20. A method, as defined in claim 14, wherein the sampling includes sampling the portion of the array of pressure sensors to generate the first sample based on the periodically sampling the alternating pixels in the array such that the sampled pixels are distributed in the periodic pattern throughout the array.

* * * * *

UNITED STATES PATENT AND TRADEMARK OFFICE
CERTIFICATE OF CORRECTION

PATENT NO. : 7,460,109 B2  Page 1 of 1
APPLICATION NO. : 10/689317
DATED : December 2, 2008
INVENTOR(S) : Max Safai et al.

It is certified that error appears in the above-identified patent and that said Letters Patent is hereby corrected as shown below:

In the Claims:

Column 5, Line 2, Claim 4, delete "read" and insert -- random --;

Column 6, Line 2, Claim 11, delete "read" and insert -- random --;

Column 6, Line 6, Claim 11, after "receiving" insert -- and processing --.

Signed and Sealed this

Twenty-sixth Day of October, 2010

David J. Kappos
*Director of the United States Patent and Trademark Office*